United States Patent
Alex et al.

(10) Patent No.: US 7,173,905 B1
(45) Date of Patent: Feb. 6, 2007

(54) PDSN FAST TUNNEL LOOKUP

(75) Inventors: Arun C. Alex, Schaumburg, IL (US); Chandra Warrier, Schaumburg, IL (US)

(73) Assignee: UTStarcom, Inc., Alameda, CA (US)

( * ) Notice: Subject to any disclaimer, the term of this patent is extended or adjusted under 35 U.S.C. 154(b) by 671 days.

(21) Appl. No.: 09/920,980

(22) Filed: Aug. 2, 2001

(51) Int. Cl.
 *H04L 12/28* (2006.01)
(52) U.S. Cl. ............... 370/230; 370/331; 370/338; 370/353; 370/389; 370/401
(58) Field of Classification Search ......... 370/230, 370/331, 338, 353, 401, 389; 709/202
See application file for complete search history.

(56) References Cited

U.S. PATENT DOCUMENTS

| | | | |
|---|---|---|---|
| 6,434,134 B1* | 8/2002 | La Porta et al. | 370/338 |
| 6,452,920 B1* | 9/2002 | Comstock | 370/349 |
| 6,466,964 B1* | 10/2002 | Leung et al. | 709/202 |
| 6,522,880 B1* | 2/2003 | Verma et al. | 455/436 |
| 6,608,832 B2* | 8/2003 | Forslow | 370/353 |
| 6,621,810 B1* | 9/2003 | Leung | 370/338 |
| 6,665,537 B1* | 12/2003 | Lioy | 455/435.1 |
| 6,701,361 B1* | 3/2004 | Meier | 709/224 |
| 6,707,809 B1* | 3/2004 | Warrier et al. | 370/351 |
| 6,760,444 B1* | 7/2004 | Leung | 380/270 |
| 6,856,624 B2* | 2/2005 | Magret | 370/392 |
| 6,862,622 B2* | 3/2005 | Jorgensen | 709/226 |
| 6,894,994 B1* | 5/2005 | Grob et al. | 370/335 |
| 6,954,790 B2* | 10/2005 | Forslow | 709/227 |
| 6,963,582 B1* | 11/2005 | Xu | 370/466 |
| 6,985,464 B2* | 1/2006 | Harper et al. | 370/331 |
| 6,999,435 B2* | 2/2006 | Perras | 370/331 |
| 2002/0021681 A1* | 2/2002 | Madour | 370/331 |
| 2002/0066036 A1* | 5/2002 | Makineni et al. | 713/201 |
| 2002/0145993 A1* | 10/2002 | Chowdhury et al. | 370/338 |
| 2002/0154642 A1* | 10/2002 | Hagirahim et al. | 370/401 |
| 2003/0021252 A1* | 1/2003 | Harper et al. | 370/338 |

OTHER PUBLICATIONS

RFC 2344: May 1998: Reverse Tunneling for Mobile IP: G. Montenegro, Editor.*
RFC 2784: Mar. 2000: Generic Routing Encapsulation (GRE): D. Farinacci et al.*
RFC 2661—Layer Two Tunneling Protocol "L2TP": W. Townsley et al.*
G. Montenegro, "Reverse Tunneling for Mobile IP, Revised", Network Working Group, RFC 3024, Jan. 2001, pp. 1-30.
C. Perkins, "IP Mobility Support", Network Working Group. RFC 2002, Oct. 1996, pp. 1-79.

* cited by examiner

*Primary Examiner*—Hassan Kizou
*Assistant Examiner*—Jay P. Patel
(74) *Attorney, Agent, or Firm*—UTStarcom, Inc.

(57) ABSTRACT

A connection with a mobile node is established. A registration request is received and a tunnel identifier determined. The tunnel identifier is independent of (i) a home address of the mobile node and (ii) an address of a home agent for the mobile node. The registration request is transmitted to the home agent, and the registration request includes the tunnel identifier. A response to the request is received and, responsively, a connection is activated. Data packets are received from the home agent in response to transmitting the registration request. The data packets include the tunnel identifier. The connection is identified using the tunnel identifier and the packets are routed along the connection.

16 Claims, 5 Drawing Sheets

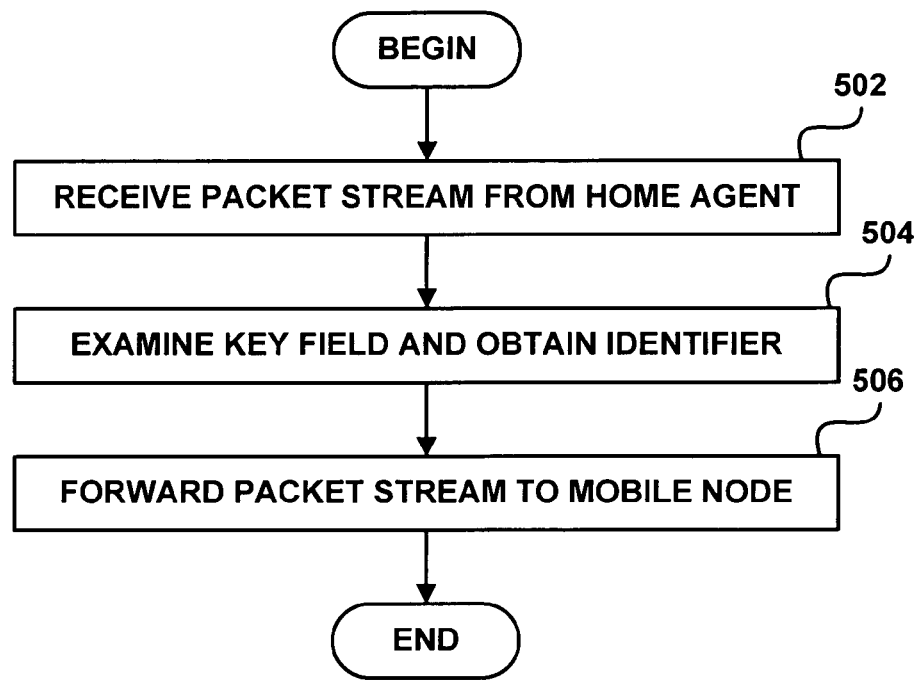
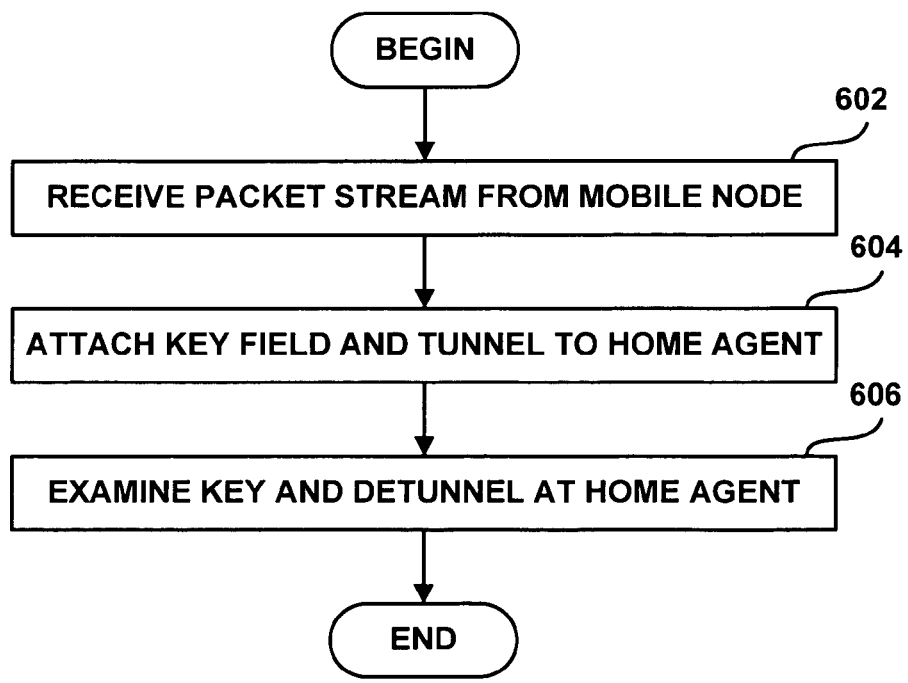

PDSN FAST TUNNEL LOOKUP

FIELD OF THE INVENTION

This present invention relates to the routing of messages across networks. More specifically, it relates to routing data messages through tunnels quickly and efficiently.

BACKGROUND OF THE INVENTION

Computer networks have become widely used in society today. Mobile nodes, for example, cellular telephones, are often used in conjunction with these networks. User devices, such as computers, may be connected to mobile nodes. In this way, the user device (e.g., the computer) may be in direct communication with some or all of the networks and other devices connected to these networks.

As mobile nodes move between networks, the ability to locate and communicate with the mobile node is preferably maintained. For instance, the mobile node may be assigned a home network. The home network may include a home agent. The mobile node may move to other networks ("foreign networks") that are not the home network. As the mobile node moves to these foreign networks it may register a care-of-address with the home network and the home agent in the home network. The mobile node also may register this care-of-address with a foreign agent on the foreign network. In this way, messages can be transmitted from a device in any network to the mobile node, no matter where the mobile node is located. Also, the mobile node (and user devices coupled to the mobile node) may transmit messages to the home network and receive messages from the home network.

A tunnel may be used to transmit the information from the tunnel endpoints. In tunneling, packets or frames from one network are placed inside frames ("encapsulated") of another network. The encapsulated frames may include a header with sufficient routing information to transmit the encapsulated frame from a source to a destination. In one example of tunneling, the home agent may tunnel data to the mobile node when the mobile node is on a foreign network. In another example of tunneling, a tunnel may be established between the foreign agent and the home agent to transmit data between the mobile node and the home agent when the mobile node is attached to a foreign network. Once the encapsulated frames reach the tunnel endpoint, they are unencapulated and transmitted to the ultimate destination.

SUMMARY OF THE INVENTION

The system and method of the present invention advantageously allows the fast and efficient transfer of information through a tunnel. Specifically, the system and method of the present invention allows the quick and efficient transfer of this information through a tunnel using a tunnel identifier.

In one example of the present invention, a device may establish a connection with a mobile node. The device may receive a registration request. After receiving the registration request, the device may determine a tunnel identifier. The device may transmit the registration request to a home agent and the registration request may include the tunnel identifier.

The device may receive a response to the request and, responsively, activate a connection. The device may receive data packets from the home agent in response to transmitting the registration request, and the data packets may include the tunnel identifier. The device may identify the connection using the tunnel identifier and route the packets along the connection.

In another example of the present invention, a mobile node is coupled to a packet data-switching node (PDSN). The PDSN is coupled to a home network and the home network includes the home agent of the mobile node.

The PDSN may receive a registration request from a mobile node and the PDSN may assign a tunnel identifier to a plurality of packets associated with the registration request and received from the mobile node.

The home agent may receive and store the tunnel identifier in the registration request and send return packets to the PDSN including the tunnel identifier. The PDSN may receive a response message from the home agent and establish a connection between the mobile node and the home agent. The PDSN may extract the tunnel identifier from the return packets and translate the tunnel identifier into information representative of the connection. The PDSN may transmit the return packets on the connection.

These as well as other features and advantages of the present invention will become apparent to those of ordinary skill in the art by reading the following detailed description, with appropriate reference to the accompanying drawings.

BRIEF DESCRIPTION OF THE DRAWINGS

Preferred embodiments of the present inventions are described with reference to the following drawings, wherein:

FIG. 5 is a flowchart of one example of the operation of a PDSN in accordance with a preferred embodiment of the present invention; and FIG. 6 is a flowchart of one example of the operation of a PDSN in accordance with a preferred embodiment of the present invention.

DETAILED DESCRIPTION OF PREFERRED EMBODIMENTS

Figure 1:
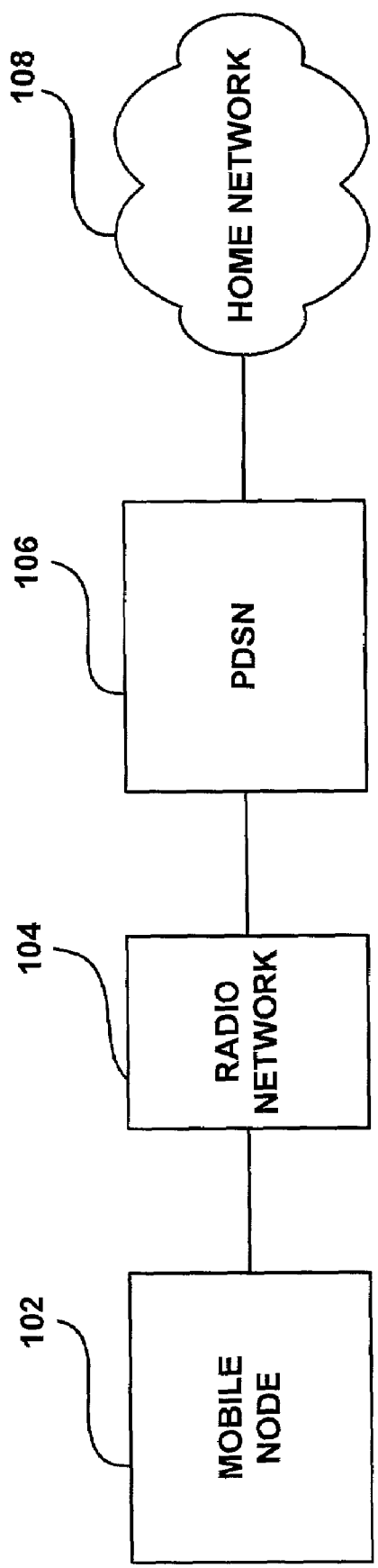
FIG. 1 is a diagram illustrating a preferred embodiment of the system for fast tunnel lookup in accordance with the present invention.

Referring to FIG. 1, a system includes a mobile node 102, a radio network 104, a packet data-switching node (PDSN) 106, and a home network 108. The mobile node 102 is coupled to the radio network 104. The radio network 104 is coupled to the PDSN 106. The PDSN 106 is coupled to the home network 108.

The mobile node 102 may be any type of device capable of communicating with a wireless network. For example, the mobile node 102 may be a cellular telephone, a personal digital assistant (PDA), or a computer. Other examples of mobile nodes are possible. In addition, the mobile node 102 may be a combination of devices where one or more devices in the combination is capable of maintaining communications with a wireless network. For example, a personal computer may be coupled to a cellular telephone and the cellular telephone may be coupled to the radio network. Other examples of combinations of devices and networks are possible.

The radio network 104 may be any type of network that locates and facilitates communications with mobile wireless devices. For example, the radio network 104 may be a cellular telephone network and may include base stations, switches, and gateways. The radio network 104 may include other devices, as well. In addition, the radio network 104 may be any combination of suitable networks where the networks are coupled together.

The functions of the PDSN 106 may be implemented by computer instructions stored in a memory and executed by a processor. The PDSN 106 may perform foreign agent functionality. For example, the PDSN may forward a care-of-address to the home agent of the mobile node. In addition, the PDSN 106 may initiate authentication, authorization, and accounting functions for the mobile client.

The PDSN 106 may create a unique identifier for a call and transmit the unique identifier to the home agent. The PDSN 106 may receive a response from the home agent and establish a connection between the home agent and the mobile node. The PDSN 106 may also receive information from the home agent and the information may be associated with a particular identifier. The PDSN may extract this identifier from the information, translate the identifier into connection information, and forward the information along the connection having the determined connection information.

The PDSN 106 may include a memory. The memory may include a plurality of tables to establish the connection. For example, the memory may include a tunnel table. The tunnel table may have entries that are indexed by identifiers. The entries in the tunnel table may point to a connection table. The connection table may have entries that specify a connection.

The tunnel table may be populated when the PDSN 106 assigns an identifier to a particular call, for example. The connection table may be populated when the connection is made between the mobile and the home agent, for instance. Other examples of data structures may also be used.

The home network 108 may be any type of network. For example, it may be the Internet, a local area network (LAN), or a wireless network. In addition, the home network 108 may be any combination of networks that use any combination of technology.

In one example of the operation of the system shown in FIG. 1, the mobile node 102 may send a registration request to the PDSN 106. The PDSN 106 may receive the request and assign a tunnel identifier to the call represented by the request. The PDSN 106 may attach the tunnel identifier to the request and forward the request to the home agent 108. The PDSN 106 may also add an entry to the tunnel table indicating the tunnel identifier with an associated entry pointing to an entry in the connection table. At this point, this entry is empty.

The home agent 108 may receive the request and issue a response. The response may be sent by the home agent 108 to the PDSN 106. The PDSN 106 may forward the response to the mobile node 102. The PDSN 106 may then establish a session between the mobile node 102 and the home agent 108. The session may include connection information, which uniquely identifies and specifies the connection. The PDSN 106 may then add this entry to the connection table and fill in the empty entry in the tunnel table, such that this entry points to the new entry in the connection table.

Subsequently, the home agent 108 may send packets of information with the tunnel identifier to the PDSN 106. The PDSN 106 may receive the packets and extract the tunnel identifier. The PDSN 106 may use the tunnel identifier to find an entry in the tunnel table indexed by the tunnel identifier. The entry in the tunnel table may point to an entry in the connection table. The PDSN 106 may then route the packets on the specified connection.

Figure 2:
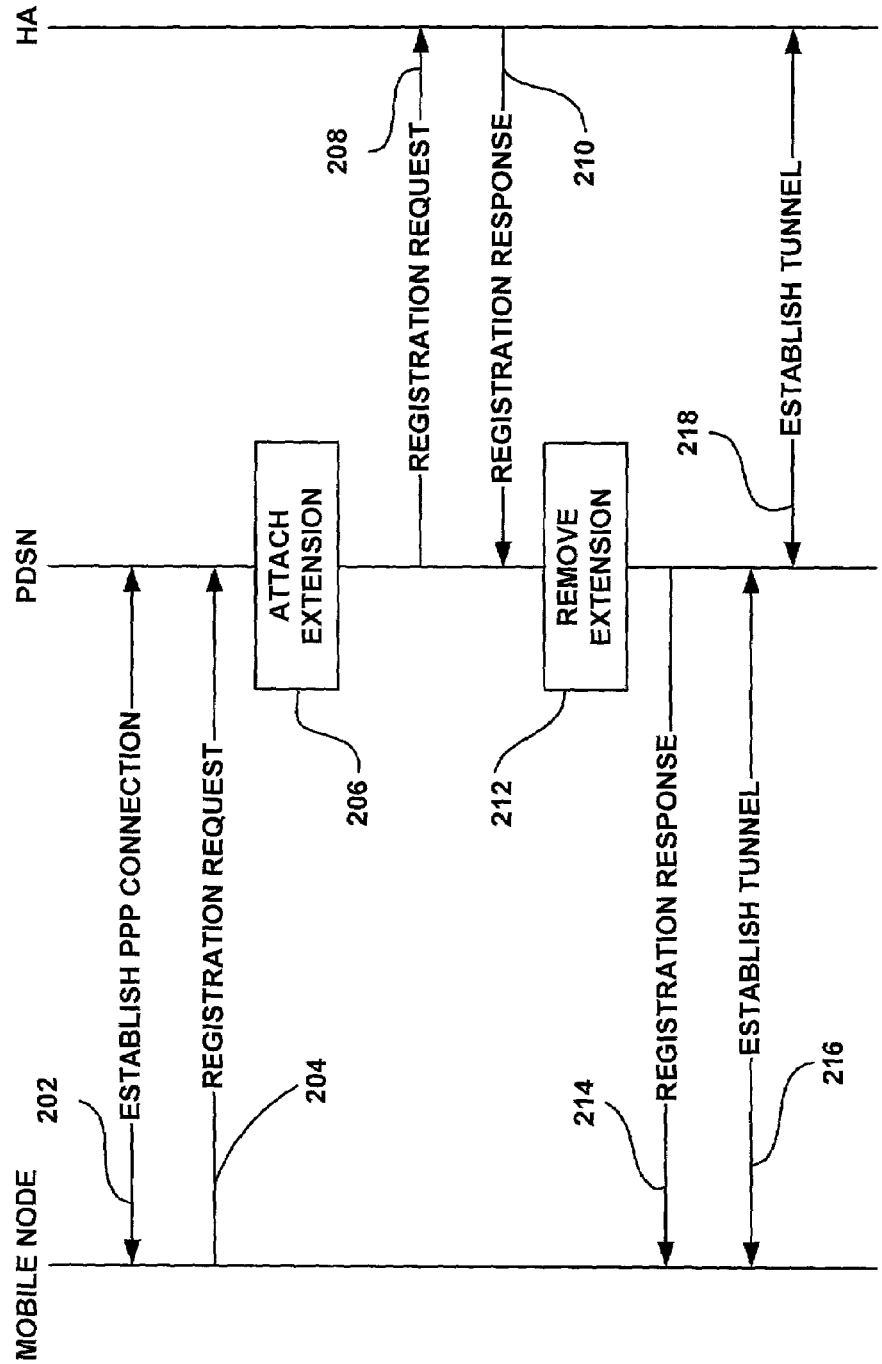
FIG. 2 is a diagram illustrating a call-flow diagram for performing fast tunnel look-up in accordance with a preferred embodiment of the present invention.

Referring to FIG. 2, a call flow diagram illustrating one example of the interaction between a mobile node, PDSN, and home agent is described. The diagram describes one example of communication between the mobile node, PDSN, and home network (with the home agent of the mobile node).

At step 202, a point-to-point (PPP) connection is established between the mobile node and the PDSN. For example, the PDSN and the mobile node may exchange PPP control information to establish a link. This interchange may include an authentication phase wherein the mobile node is authenticated. Subsequent to the authentication phase an IP address negotiation phase follows during which an IP address is assigned to the mobile node for it to establish IP communication with the home network. Other steps may also be included.

At step 204, a registration request is sent from the mobile node to the PDSN. The registration request may include the IP address assigned to the mobile during the PPP phase, the IP address of the PDSN and the IP tunneling scheme that it wishes to use (for example, Generic Routing Encapsulation (GRE)), the IP address of the home agent, and authentication information using which the home agent can authenticate the mobile node. Other types of information may also be included in the registration request.

At step 206, the PDSN attaches a vendor-specific extension for the key, for example, a GRE key, before the registration request is sent to the home agent. The vendor-specific extension may indicate the tunnel identifier.

At step 208, the registration request is transmitted from the PDSN to the home agent. The PDSN may also assign a tunnel identifier to the call.

At step 210, the home agent saves the tunnel identifier and sends a registration response to the PDSN. The registration response may include the IP address of the mobile, the IP address of the home agent and authentication information using which the mobile node can authenticate the home agent. The registration response may include other types of information, as well. The home agent may fill a field in the header (e.g., the key field in a header) with the tunnel identifier and sends the data packets to the PDSN.

At step 212, the PDSN removes vendor-specific extensions for the GRE key before re-transmitting the registration response. For example, the PDSN may only remove the vendor-specific information for the key and any other information that was not sent by the mobile node in the original request.

At step 214, the PDSN transmits the registration response to the mobile node. The registration response may have the vendor-specific information removed. The PDSN uses the key (e.g., the GRE key) to do a direct look-up of the appropriate tunnel to the mobile node.

At step 216, a tunnel is established between the mobile and the PDSN.

At step 218, a tunnel is established between the PDSN and the home agent. The header may use the key previously exchanged during registration.

Figure 3:
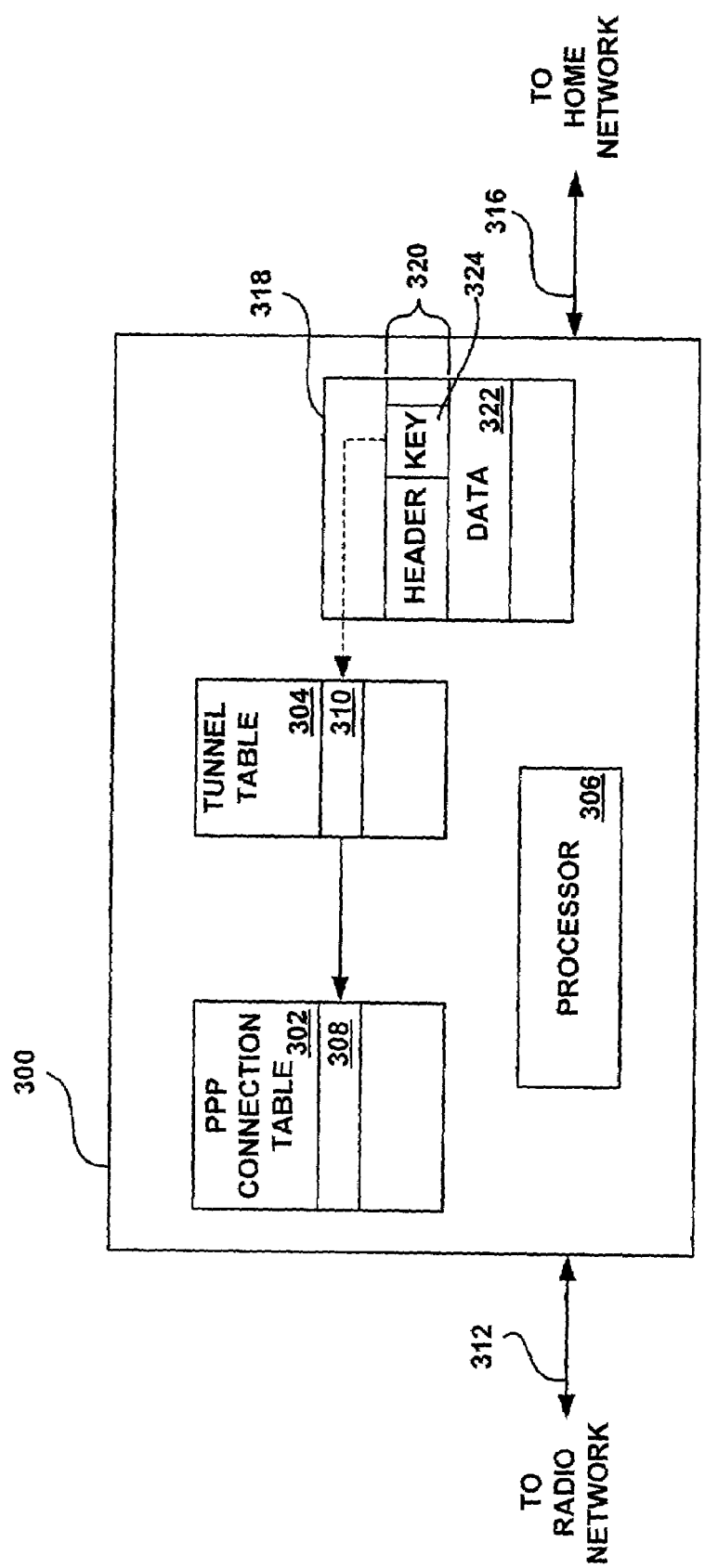
FIG. 3 is a diagram illustrating one example of a PDSN in accordance with a preferred embodiment of the present invention.

Referring to FIG. 3, one example of a PDSN 300 includes a PPP connection table 302, a tunnel table 304, and a processor 306. The PPP connection table 302 may include an entry 308 and the tunnel table 304 may include an entry 310. A link 312 may couple the PDSN 300 to a radio network. A link 316 may couple the PDSN to a home network. A packet 318 may be transmitted from the home network to the PDSN 300 via the link 316. The packet may include a header portion 320 and a data portion 322. The header portion may have a key entry 324.

The processor 306 may be any type of processor capable of processing computer instructions stored in a memory. In addition, the processor may be any combination of hardware or software used to implement any or all of the functions of the PDSN.

A packet 318 may be any entity used to transmit or carry any type of information. The header portion 320 includes the key field 324. The contents of the key field 324 may be a tunnel identifier. For example, the tunnel identifier may be an integer value. The header 320 may include other types of information, for example, error detection information.

The tunnel table 304 may include a plurality of entries. Each of the entries may point to an entry in the PPP connection table 302. For example, the entry 310 may be a pointer to a location in the PPP connection table 302. The tunnel table 304 may be created at system start-up. Entries in the tunnel table 304 may be added when tunnel identifiers are assigned. The entries (indexed by the tunnel identifiers) may be made whenever connection information becomes available.

The PPP connection table 302 may include a plurality of entries. The entries may specify a particular connection. For example, the entry 308 may include link information for the PPP interface, for example, the IP address of the mobile, the radio node associated with this mobile node and other link specific information. The PPP connection table 302 may be created at system start-up. The entries in the connection table are pointed to by entries in the tunnel table 304. The entries in the PPP connection table 302 may be filled in when connection information becomes available.

Figure 4:
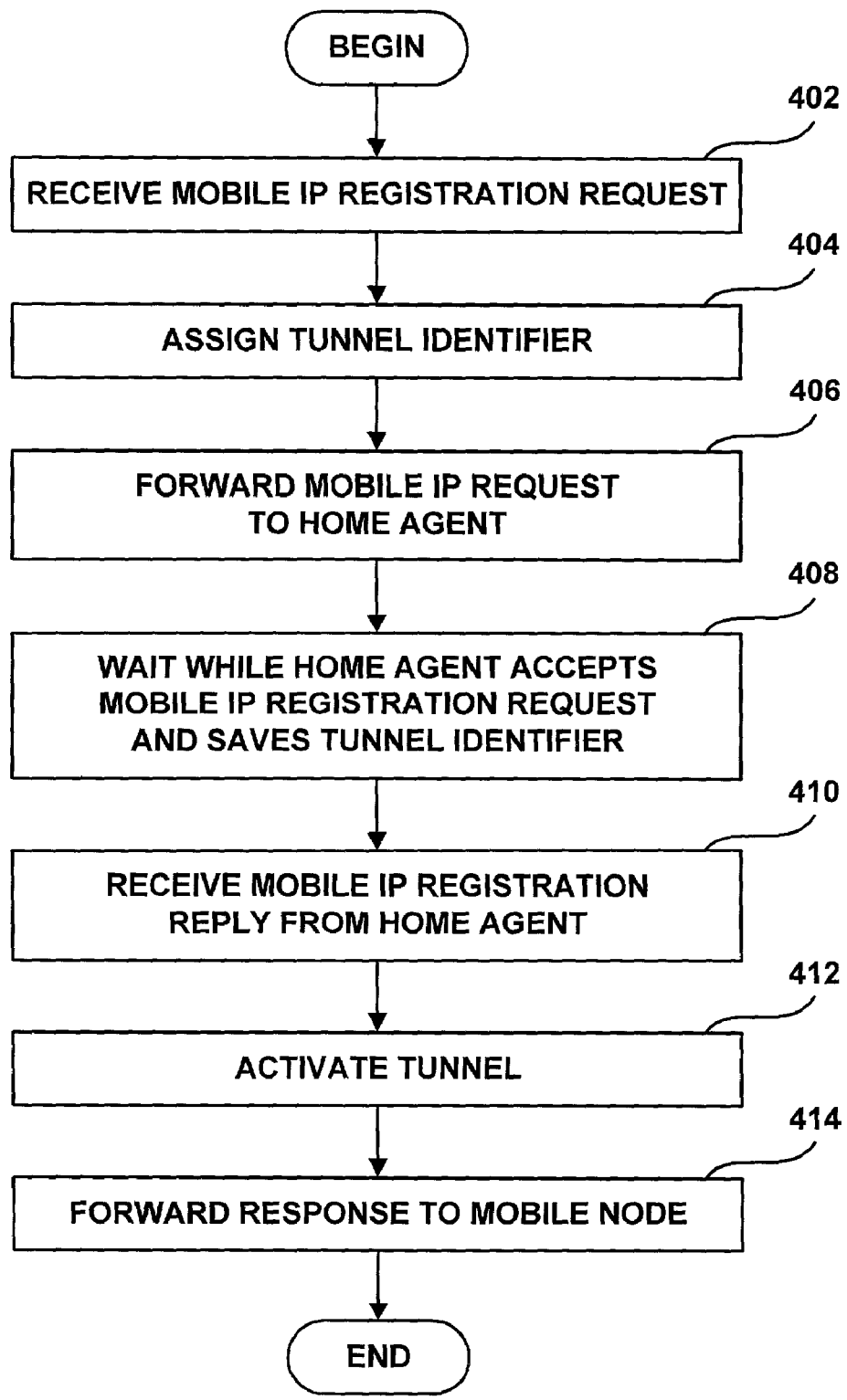
FIG. 4 is a flowchart of one example of the operation of a PDSN in accordance with a preferred embodiment of the present invention.

Referring now to FIG. 4, one aspect of the operation of the PDSN is described. Specifically, FIG. 4 describes one example of setting up a call. At step 400, the PDSN receives a mobile IP registration request. In one example, the mobile IP registration request may be in the form of a UDP packet. Other examples of mobile IP registration requests are possible.

At step 404, the PDSN assigns a tunnel identifier to the call. The tunnel identifier may be assigned randomly or non-randomly. The tunnel identifier may be in any form, for example, an integer. Other examples of tunnel identifiers are possible.

At step 406, the PDSN forwards the registration response to the home agent of the mobile node. The home agent of the mobile node may be indicated by the care-of-address of the mobile node, which is stored in the PDSN.

At step 408, the PDSN waits while the home agent accepts the mobile IP registration request and saves the tunnel identifier. At step 410, the PDSN receives a registration reply from the home agent. For example, the reply may be in the form of a Mobile IP registration reply. Other examples of replies are possible.

At step 412, the PDSN may activate the tunnel. For example, the PDSN may create an IP tunnel to the home agent using the GRE protocol. At step 414, the PDSN may forward the response to the mobile node.

Referring now to FIG. 5, one aspect of the operation of the PDSN is described. Specifically, FIG. 5 describes one example of how the PDSN moves data from the home agent to a mobile node.

At step 502, the PDSN receives a stream of packets from a home agent, for example, representing a call. The packets may be representative of any other type of information, as well.

At step 504, the PDSN examines the key field in the packet. The key field may include the tunnel identifier. The PDSN may examine the tunnel table. The tunnel table may include a tunnel table entry that corresponds to the PDSN connection table. The PDSN may obtain the connection information from the connection table. In addition, the packet may include any other field, instead of the key field, to carry the tunnel identifier.

At step 506, the PDSN forwards the packet stream to the mobile node.

Referring now to FIG. 6, one aspect of the operation of the PDSN is described. Specifically, FIG. 6 illustrates one example of how the PDSN moves data from the mobile node to the home agent.

At step 602, the PDSN receives a packet stream from the mobile node. At step 604, the PDSN determines the tunnel identifier (which may be stored), attaches the tunnel identifier to a key field, and creates a tunnel. At step 606, the home agent examines the key and detunnels at the home agent. For instance, the home agent may extract the original IP packet from the mobile node and forward it to its ultimate destination (e.g., a web server).

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa.

It will be apparent to those of ordinary skill in the art that methods involved in the system and method for fast tunnel lookup may be embodied in a computer program product that includes a computer usable medium. For example, such a computer usable medium can include a readable memory device, such as, a hard drive device, a CD-ROM, a DVD-ROM, or a computer diskette, having computer readable program code segments stored thereon. The computer readable medium can also include a communications or transmission medium, such as, a bus or a communications link, either optical, wired, or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A method for establishing a connection with a mobile node, the method comprising:
receiving a registration request;
determining a tunnel identifier;
transmitting the registration request to the home agent, the registration request including the tunnel identifier in a key field of a tunnel header of the registration request;
receiving a response to the request and, responsively, activating a connection;
receiving data packets from the home agent in response to transmitting the registration request, the data packets including the tunnel identifier in a key field of a tunnel header of the data packets;
identifying the connection using the tunnel identifier, wherein identifying the connection using the tunnel identifier comprises using the tunnel identifier to identify an entry in a tunnel table and using the entry in the tunnel table to identify an entry in a connection table, wherein the tunnel table is indexed by tunnel identifiers, and wherein the entry in the connection table identifies the connection; and
routing the packets along the connection.

2. A method for establishing a connection with a mobile node, the method comprising:
receiving a registration request from a mobile node, the mobile node having a home agent, the registration request also representing a call;
assigning a tunnel identifier to the call associated with the registration request;
forwarding the registration request to the home agent, the registration request including the tunnel identifier in a key field of a tunnel header of the registration request;
establishing a connection;
receiving a registration response and forwarding the registration response to the mobile node;
receiving packets of data from the home agent, each of the packets of data including the tunnel identifier in a key field of a tunnel header of the packet; and
subsequently, using the tunnel identifier to identify the connection for packets having the tunnel identifier, wherein using the tunnel identifier to identify the connection for packets having the tunnel identifier comprises using the tunnel identifier to identify an entry in a tunnel table and using the entry in the tunnel table to identify an entry in a connection table, wherein the tunnel table is indexed by tunnel identifiers, and wherein the entry in the connection table identifies the connection.

3. The method of claim 2 wherein the connection information is from the point-to-point protocol (PPP).

4. The method of claim 2 wherein each of the packets includes a header and the header is a Generic Routing Encapsulation (GRE) header.

5. A method comprising:
receiving a registration request;
receiving a data stream, the data stream associated with the registration request, the data stream including a plurality of packets;
assigning a tunnel identifier to the data stream;
transmitting the registration request to the home agent, the registration request including the tunnel identifier in a key field of a tunnel header of the registration request;
receiving return packets of information, the return packets of information including the tunnel identifier in a key field of a tunnel header of the return packets; and
translating the tunnel identifier into a connection and transmitting the return packets using the connection, wherein translating the tunnel identifier into the connection comprises using the tunnel identifier to identify an entry in a tunnel table and using the entry in the tunnel table to identify an entry in a connection table, wherein the tunnel table is indexed by tunnel identifiers, and wherein the entry in the connection table identifies the connection.

6. The method of claim 5 wherein the step of translating includes establishing the tunnel table, the tunnel table having entries corresponding to tunnel identifiers.

7. The method of claim 6 wherein the step of translating includes establishing the connection table, the connection table including connection information for entries in the tunnel table.

8. The method of claim 7 wherein the connection table includes information according to the point-to-point protocol (PPP) format.

9. A system comprising:
a mobile node;
a packet data-switching node (PDSN), the PDSN communicatively coupled to the mobile node, the PDSN receiving a registration request from the mobile node, the PDSN assigning a tunnel identifier to a plurality of packets received from the mobile node, the PDSN further inserting the tunnel identifier in a key field of a tunnel header of the plurality of packets;
a home agent coupled to the PDSN, the home agent receiving and storing the tunnel identifier in the registration request and sending return packets to the PDSN including the tunnel identifier in a key field of a tunnel header of the return packets;
wherein the PDSN receives a response message from the home agent and establishes a connection between the mobile node and the home agent; and
wherein the PDSN extracts the tunnel identifier from the return packets and translates the tunnel identifier into information representative of the connection, and transmits the return packets on the connection, wherein the PDSN translating the tunnel identifier into information representative of the connection comprises the PDSN using the tunnel identifier to identify an entry in a tunnel table and using the entry in the tunnel table to identify an entry in a connection table, wherein the tunnel table is indexed by tunnel identifiers, and wherein the entry in the connection table identifies the connection.

10. The system of claim 9 wherein the connection is made according to the point-to-point protocol (PPP).

11. The system of claim 9 wherein the PDSN includes the tunnel table and the connection table, and wherein the connection table is a point-to-point protocol (PPP) connection table.

12. A system for establishing a connection with a mobile node, the system comprising:
means for receiving a registration request;
means for determining a tunnel identifier;
means for transmitting the registration request to the home agent, the registration request including the tunnel identifier in a key field of a tunnel header of the registration request;
means for receiving a response to the request and, responsively, activating a connection;
means for receiving data packets from the home agent in response to transmitting the registration request, the data packets including the tunnel identifier in a key field of a tunnel header of the data packets;
means for identifying the connection using the tunnel identifier, wherein identifying the connection using the tunnel identifier comprises using the tunnel identifier to identify an entry in a tunnel table and using the entry in the tunnel table to identify an entry in a connection table, wherein the tunnel table is indexed by tunnel identifiers, and wherein the entry in the connection table identifies the connection; and
means for routing the packets along the connection.

13. A system for establishing a connection with a mobile node, the system comprising:

means for receiving a registration request from a mobile node, the mobile node having a home agent, the registration request also representing a call;
means for assigning a tunnel identifier to the call associated with the registration request;
means for forwarding the registration request to the home agent, the registration request including the tunnel identifier in a key field of a tunnel header of the registration request;
means for establishing a connection;
means for receiving a registration response and forwarding the registration response to the mobile node;
means for receiving packets of data from the home agent, each of the packets of data including the tunnel identifier in a key field of a tunnel header of the packet; and
means for using the tunnel identifier to identify the connection for packets having the tunnel identifier, wherein using the tunnel identifier to identify the connection for packets having the tunnel identifier comprises using the tunnel identifier to identify an entry in a tunnel table and using the entry in the tunnel table to identify an entry in a connection table, wherein the tunnel table is indexed by tunnel identifiers, and wherein the entry in the connection table identifies the connection.

14. A system comprising:
means for receiving a registration request;
means for receiving a data stream, the data stream associated with the registration request, the data stream including a plurality of packets;
means for assigning a tunnel identifier to the data stream;
means for transmitting the registration request to a home agent, the registration request including the tunnel identifier in a key field of a tunnel header of the registration request;
means for receiving return packets of information, the return packets of information including the tunnel identifier in a key field of a tunnel header of the return packets; and
means for translating the tunnel identifier into a connection and transmitting the return packets using the connection, wherein translating the tunnel identifier into the connection comprises using the tunnel identifier to identify an entry in a tunnel table and using the entry in the tunnel table to identify an entry in a connection table, wherein the tunnel table is indexed by tunnel identifiers, and wherein the entry in the connection table identifies the connection.

15. A computer readable medium having stored therein instructions for causing a processing unit to execute the following method:

receiving a registration request;
determining a tunnel identifier;
transmitting the registration request to the home agent, the registration request including the tunnel identifier in a key field of a tunnel header of the registration request;
receiving a response to the request and, responsively, activating a connection;
receiving data packets from the home agent in response to transmitting the registration request, the data packets including the tunnel identifier in a key field of a tunnel header of the data packets;
identifying the connection using the tunnel identifier, wherein identifying the connection using the tunnel identifier comprises using the tunnel identifier to identify an entry in a tunnel table and using the entry in the tunnel table to identify an entry in a connection table, wherein the tunnel table is indexed by tunnel identifiers, and wherein the entry in the connection table identifies the connection; and
routing the packets along the connection.

16. A computer program embedded in a computer readable medium for establishing a connection between a mobile node and a home agent, the program comprising:
first code for receiving a registration request;
second code for determining a tunnel identifier;
third code for transmitting the registration request to the home agent, the registration request including the tunnel identifier in a key field of a tunnel header of the registration request;
fourth code for receiving a response to the request and, responsively, activating a connection;
fifth code for receiving data packets from the home agent in response to transmitting the registration request, the data packets including the tunnel identifier in a key field of a tunnel header of the data packets;
sixth code for identifying the connection using the tunnel identifier, wherein identifying the connection using the tunnel identifier comprises using the tunnel identifier to identify an entry in a tunnel table and using the entry in the tunnel table to identify an entry in a connection table, wherein the tunnel table is indexed by tunnel identifiers, and wherein the entry in the connection table identifies the connection; and
seventh code for routing the packets along the connection.

* * * * *